US007237376B1

(12) United States Patent
Shirley et al.

(10) Patent No.: US 7,237,376 B1
(45) Date of Patent: Jul. 3, 2007

(54) CHAIN REPAIR SYSTEM

(75) Inventors: Scott Baxter Shirley, Pfafftown, NC (US); Carlton Leon Jones, King, NC (US)

(73) Assignees: R. J. Reynolds Tobacco Company, Winston-Salem, NC (US); Luwa, Inc., Winston-Salem, NC (US)

( * ) Notice: Subject to any disclaimer, the term of this patent is extended or adjusted under 35 U.S.C. 154(b) by 329 days.

(21) Appl. No.: 11/078,045

(22) Filed: Mar. 11, 2005

(51) Int. Cl.
*F16G 13/06* (2006.01)
*B65G 19/14* (2006.01)

(52) U.S. Cl. .................... 59/84; 59/78; 59/5; 198/851; 474/234

(58) Field of Classification Search ............... 59/5, 59/78, 82, 84; 198/850, 851; 474/206, 207, 474/227, 234
See application file for complete search history.

(56) References Cited

U.S. PATENT DOCUMENTS

| 2,619,272 | A | | 11/1952 | Boehling |
| 3,125,231 | A | | 3/1964 | Mortland |
| 3,259,228 | A | | 7/1966 | Wilding |
| 3,595,011 | A | * | 7/1971 | Nicholson et al. ............... 59/8 |
| 3,811,585 | A | | 5/1974 | Wilding |
| 4,355,502 | A | * | 10/1982 | Sheldon .......................... 59/84 |
| 5,165,522 | A | * | 11/1992 | Uttke et al. ................. 198/716 |
| 5,346,057 | A | | 9/1994 | Fisher et al. |
| 5,461,852 | A | * | 10/1995 | Nagamatsu ..................... 59/84 |

* cited by examiner

*Primary Examiner*—David Jones
(74) *Attorney, Agent, or Firm*—Kilpatrick Stockton LLP (57) ABSTRACT

A system for repairing a continuous loop chain includes a plurality of pairs of chain links, each link having a pair of straight, substantially parallel side bars. Each pair of chain links has an outer link having a first width between the outer link side bars, and an inner link having a second width between the inner link side bars. The second width is less than the first width such that the side bars of the inner link are adapted to fit between the side bars of the outer link. The outer links and inner links are pivotally joined to each other. A repair link having a pair of offset side bars is adapted to connect on one end to the inner link of one of the pairs of chain links and on the other end to the outer link of another one of the pairs of chain links. In this way, a defective link, or a pair of defective links, can be replaced by one or more of the repair links. Such a system, apparatus, and method provides means useful for repairing a linked chain in a tobacco bulk silo utilized in manufacture of smoking articles.

18 Claims, 6 Drawing Sheets

CHAIN REPAIR SYSTEM

FIELD OF THE INVENTION

The present invention relates to an apparatus and system for repairing a linked chain. Embodiments of the present invention are advantageous for providing an apparatus and system for repairing a linked chain in tobacco bulk silo machinery utilized in manufacture of smoking articles.

BACKGROUND OF THE INVENTION

Generally, tobacco is processed by threshers from its whole leaf form into strips and then into smaller "cut filler" pieces. In this form, tobacco may be made into smoking articles, such as cigarettes, cigars, and the like. Various types of smoking articles are made according to blend formulas from tobacco that is stored and aged and then processed through a final processing phase. This processing phase can include conditioning, casing, cutting, drying, top flavoring, and blending. Once this is done, the raw material is finally ready to be made into the smoking articles. In order to produce a characteristic, homogenous blend of tobacco, different types of tobacco are mixed, or blended, according to precise recipes. Tobacco products are blended and/or stored in a "blend bulk silo." A "silo," or "bulker," is a bin for conveying tobacco products from a source of tobacco, blending and/or storing the tobacco, and conveying the tobacco products to processing stations for manufacturing smoking articles. A bulk silo can be used to handle whole leaf tobacco, tip leaf, "strip" tobacco, stems, cut roll stems, cut filler, and other tobacco products as well.

A typical bulk silo may be a rectangular-shaped, longitudinal bin provided with a shuttle car located over it and apparatus for feeding tobacco onto the car and then into the silo. In a blending apparatus, a portion of the bin is charged by a belt moving in one direction on a shuttle which reciprocates back and forth above the bin. The speed and direction of the belt and shuttle can be controlled so as to discharge the tobacco into the bin in an evenly filled manner. A description of such apparatus and methods of processing tobacco in a blend-bulk silo can be found in U.S. Pat. No. 3,811,585, which is incorporated by reference herein in its entirety.

An example of a tobacco bulk silo is one commonly in use today available commercially from Griffin & Cardwell, Inc., of Louisville, Ky. In such a bulk silo, tobacco is layered onto a conveyor means that is connected to a pair of drive chains. The drive chains include assemblies of links, rollers, bushings, and pins. These drive chain components become defective and ultimately inoperative from normal wear and tear related to duration of use, the load on the chain, and the abrasive effect of tobacco on metal parts.

Chains for such conveyors, as well as for other industrial applications, such as elevators, are available from Webster Industries of Tiffin, Ohio. One type of chain commonly used in automated conveyance systems in tobacco product manufacturing equipment is a "roller chain." In a roller chain, a whole chain link is configured so as to comprise two paired "half" links. One link, or half, of a matched pair has an inner width wider than the other outer width of the other half link of the pair. As such, the narrower half link can fit inside the wider half link so that the two paired half links can be pivotably attached about a pivot member, such as a pin. Due to this paired configuration of half links, replacements for a defective chain half link are provided only in units of two half links.

To replace an entire continuous loop of conveyor chain due to one (or even a few) defective half link(s) would be expensive. An entire chain can cost as much as $9,000 per chain or more. Chain link replacements for conveyors in manufacturing equipment are generally sold in relatively small volumes, and are thus expensive to make and purchase. For example, replacement of a pair of half links can cost as much as $1,800 or more. In addition, because such replacement units are so costly, it is impractical to maintain a stock of these items. Without a ready supply of chain replacement links, when a half link becomes defective and causes the chain to be inoperable, the likelihood of prolonged down time for the manufacturing equipment is increased until a replacement can be procured.

A conveyor chain in manufacturing equipment may operate effectively at a tension that is slightly loose. In tobacco product manufacturing equipment, such as a bulk silo, the gears that engage and move the conveyor chain may be repositioned to adjust the tension on the chain. The length of a chain half link can vary, and can be in a typical chain, for example, approximately six inches in length. To remove a defective half link would involve removing both the defective half link and its matched pair so that the widths of the remaining adjacent half links would properly mate in order to re-establish the continuous chain linkage. Thus, removing two six inch half links would eliminate approximately 12 inches from the overall chain length. Removing this much length from a chain would make the chain too short to connect back into a continuous loop, even with the length adjustment of the chain being at the minimum position. Thus, even with adjusting the positioning of the chain drive gears, removing a defective chain half link and its matched pair is not a workable solution to chain half link repair needs.

Thus, there is a need to provide a system for repairing a linked chain in manufacturing equipment that is relatively inexpensive and that allows maintaining a supply of such repair links for quick repair of a defective chain link.

SUMMARY OF THE INVENTION

The present invention provides embodiments of a system, an apparatus, and a method for repairing a continuous loop chain. In an embodiment of such a system, the continuous loop chain comprises a plurality of pairs of chain links. Each link includes a pair of straight, substantially parallel side bars. Each pair of chain links has an outer link having a first width between the outer link side bars, and an inner link having a second width between the inner link side bars. The second width is less than the first width such that the side bars of the inner link are adapted to fit between the side bars of the outer link. The outer link and the inner link are pivotally joined to each other. In like manner, the outer link of each pair of chain links is pivotally joined to the inner link of the pair of chain links adjacent to the outer link. The inner link of each pair of chain links is pivotally joined to the outer link of the pair of chain links adjacent to the inner link. The system for repair of a continuous loop chain includes a repair link having a pair of offset side bars. The offset side bars are adapted to connect on one end to the inner link of one of the pairs of chain links and on the other end to the outer link of another one of the pairs of chain links. In this way, a defective link, or a pair of defective links, can be replaced by one or more of the repair links.

Features of an apparatus and system for repairing a linked chain of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

An apparatus and system for repairing a linked chain of the present invention provides numerous advantages over prior means for repairing a linked chain. For example, the present invention advantageously provides an apparatus, system, and method for repairing a linked chain in manufacturing equipment that is relatively inexpensive.

Another advantage is that the present invention provides an apparatus and system for repairing a linked chain in manufacturing equipment that allows maintaining a supply of such repair links for quick repair of a defective chain link.

As will be realized by those of skill in the art, many different embodiments of an apparatus and system for repairing a linked chain according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
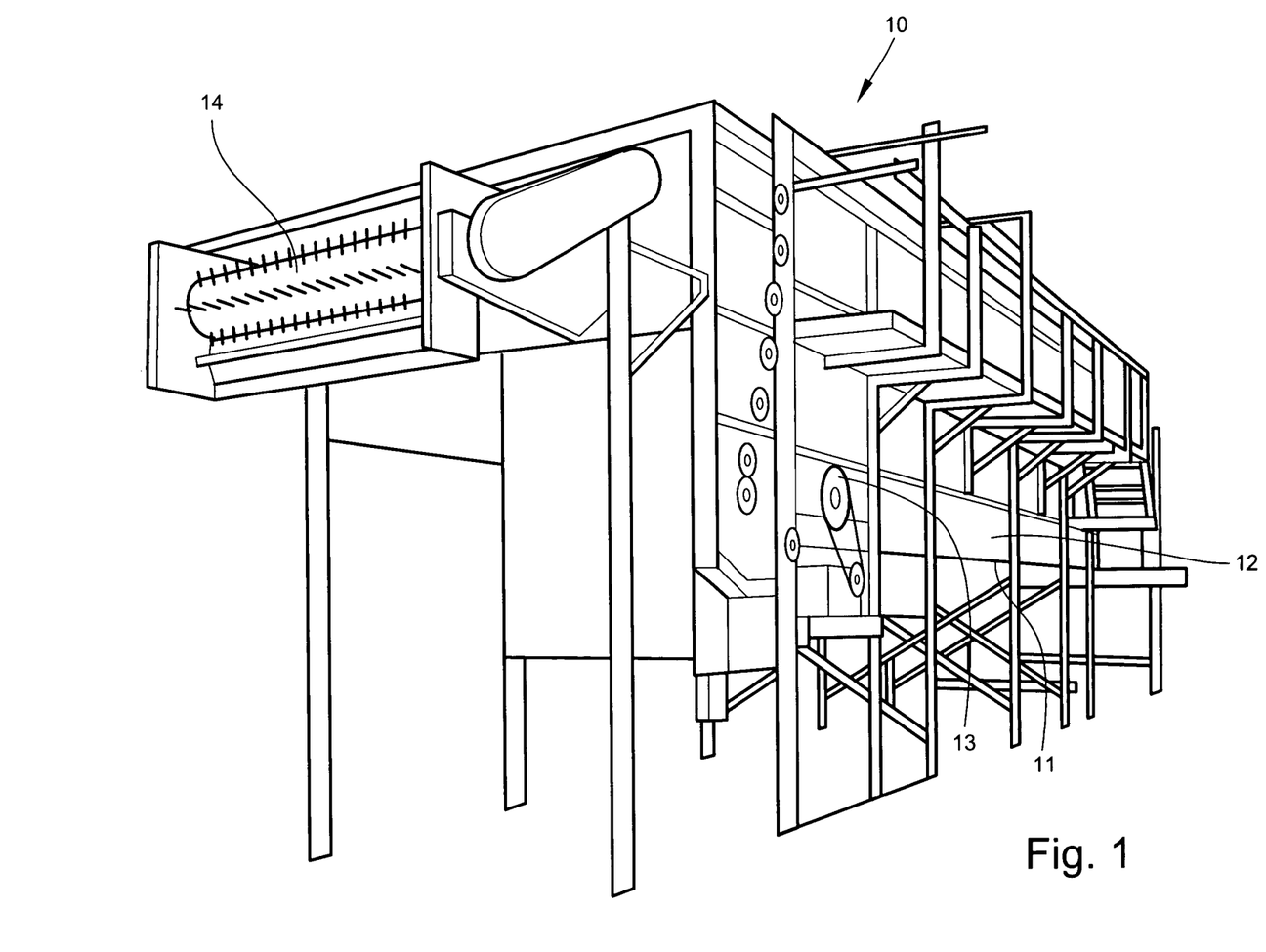
FIG. 1 is a side perspective view of a tobacco bulk silo having a chain assembly for which embodiments of an apparatus and system for repairing a linked chain of the present invention are useful.

Embodiments of the present invention provide an apparatus and system for repair of a continuous loop conveyor chain. Embodiments of the present invention are useful for repairing a chain in a tobacco bulk silo. One such bulk silo 10, as shown in FIG. 1, has a rectangular configuration and includes two side walls and two end walls. The bulk silo 10 includes two continuous loop chains 11, or chain assemblies, protected from product contamination or leakage by a chain assembly apron 12. One chain 11 is located on either side of the silo 10 substantially parallel to the other chain 11. The two chains 11 are connected by slats (described further herein) between the two chains 11. A drive means 13 engages and moves the chains 11 in a continuous loop. A drive means 13 may be, for example, an electric motor having gears connected to the chains 11.

The bulk silo 10 includes a discharge means 14 for discharging tobacco fill onto a conveyor means for conveying the tobacco fill to processing stations for the manufacture of smoking articles. The discharge means 14 can include a means for mixing or doffing the tobacco fill to separate, blend, and discharge a cross-section of the tobacco at a controlled uniform rate. The discharge rate can be metered for accurate product control. The bulk silo 10 can produce a homogenous product blend, utilizing such techniques as horizontal layering blending and/or vertical cross section discharge. The bulk silo 10 can be programmed to have automatic fill and discharge capabilities.

An example of such a bulk silo 10 is made by Griffin & Cardwell, Inc., of Louisville, Ky. Embodiments of the present invention can be utilized in bucket elevators, flight or scraper conveyors, open top carriers, as well as other types of industrial conveyors and elevators which require replacement of defective chain links.

Figure 2:
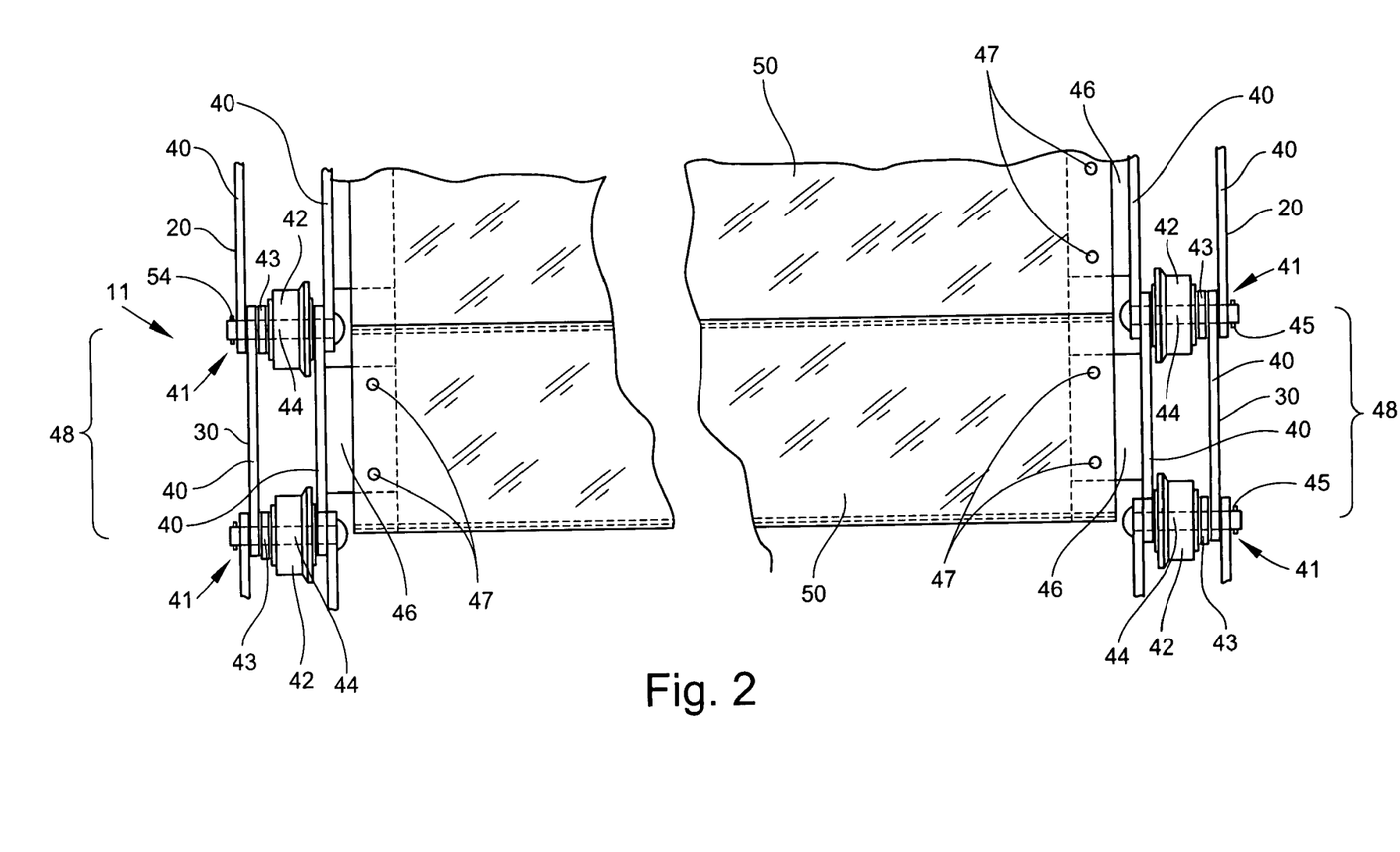
FIG. 2 is a top view of a pair of continuous chain assemblies and slats for which embodiments of an apparatus and system for repairing a linked chain of the present invention are useful.
Figure 6:
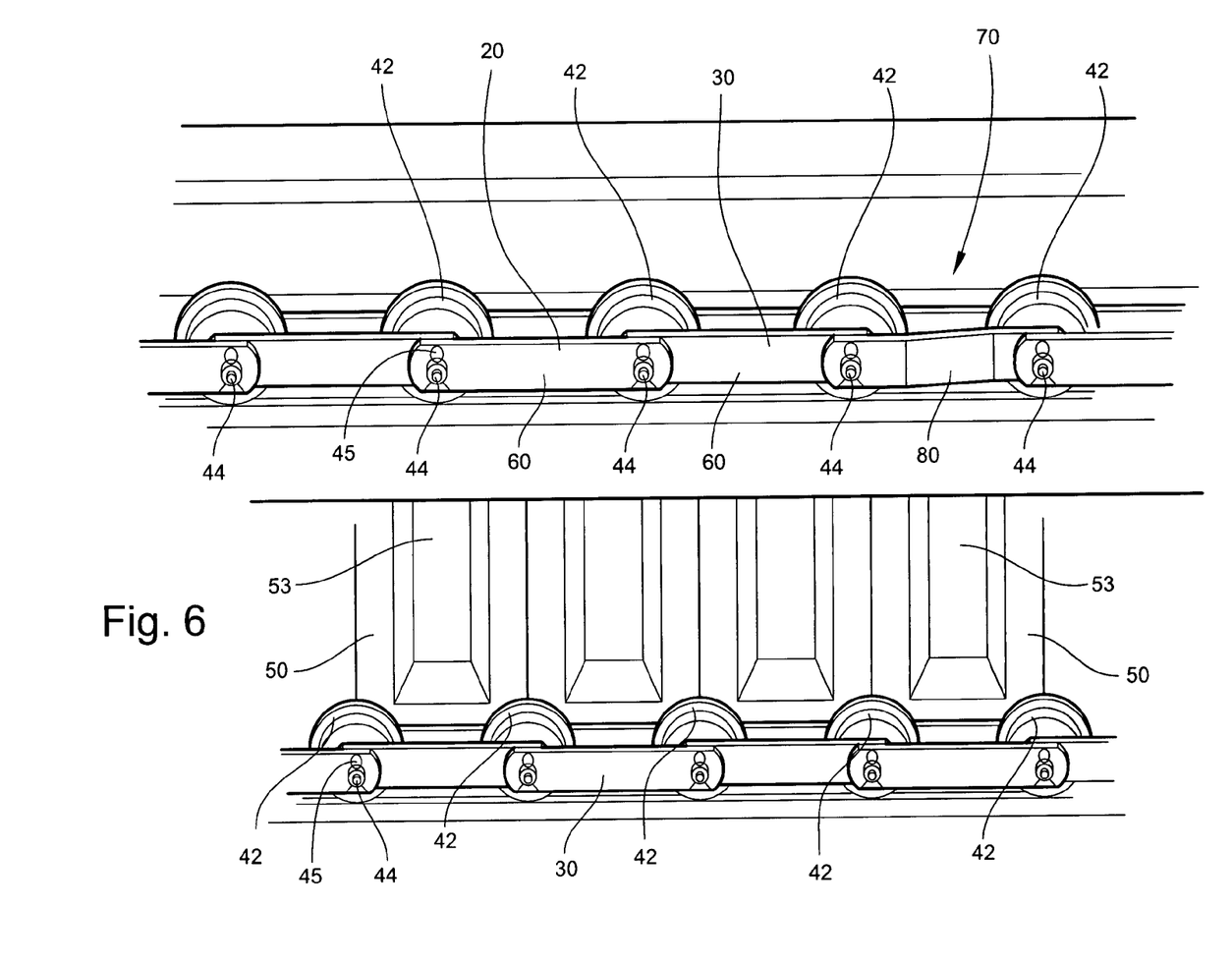
FIG. 6 is a side view of a replacement chain link with an offset sidebar installed in a continuous chain in an embodiment of the present invention.

In the present invention, each continuous loop chain 11, or chain assembly, includes a plurality of pairs of chain links, as shown in FIG. 6. One pair of links comprises a chain link unit. In a chain link unit, each of the links in the pair of links can be referred to as a "half link." As shown in FIGS. 2 and 6, one half link of a pair of links comprises an outer link 20, and the other half link of the pair comprises an inner link 30. Each half link has opposed, substantially parallel side bars 40. The outer link 20 of each pair of chain links has a first width between the inside surfaces of its side bars 40. The inner link 30 of each pair of chain links has a second width between outside surfaces of its side bars 40. The second width (the outside width of the inner link 30) is less than the first width (the inside width of the outer link 20) such that the side bars 40 of the second (inner) link 30 are adapted to fit between the side bars of the first (outer) link 20.

The side bars 40 are straight lengths of material, as shown in FIGS. 2 and 4-6. Each side bar 40 has an aperture 41 in each end of the side bar 40. The side bars 40 of a link are joined at each end by a link pin 44 that is inserted through the apertures 41 when they are aligned. The diameters of the apertures 41 and link pins 44 are sized to provide an optimum press fit of the link pins 44 in the apertures 41. When the apertures 41 in a pair of outer and inner links 20, 30, respectively, are aligned, a link pin 44 can be inserted through the apertures 41 in both links 20, 30 and thereby pivotally join the pair of links 20, 30. In like manner, each pair of links can be pivotally joined to adjacent pairs of links to form a continuous chain conveyor means.

The link pins include a head on one end that abuts the outside of the side bar 40 of an outer link 20 when the link pin 44 is inserted into the apertures 41. The end of the link pin 44 opposite the head end extends past the outside surface of the opposite side bar 40 of an outer link 20. This end of the link pin 44 opposite the head end includes an aperture 41 through the diameter of the pin 44. A cotter pin 45 can be inserted into the link pin aperture 41 to secure the link pin 44 in the side bar apertures 41 and thereby secure the two side bars 40 of a half link together, as well as secure the pair of half links 20, 30 together. In alternative embodiments, a link pin 44 can be secured in place by riveting the end of the pin 44.

Figure 4:
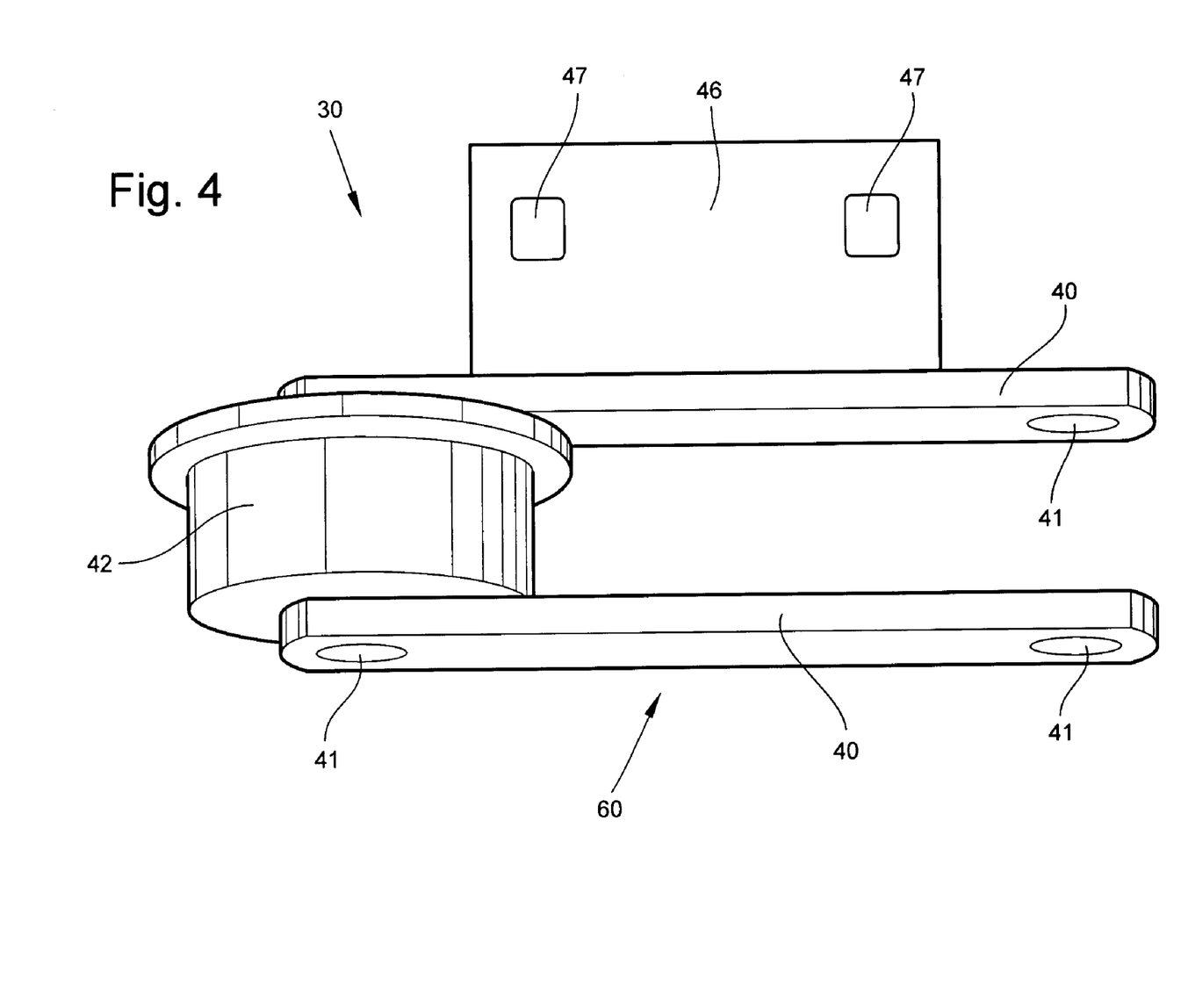
FIG. 4 is a top view of a chain link having a straight side bar in an embodiment of the present invention.
Figure 5:
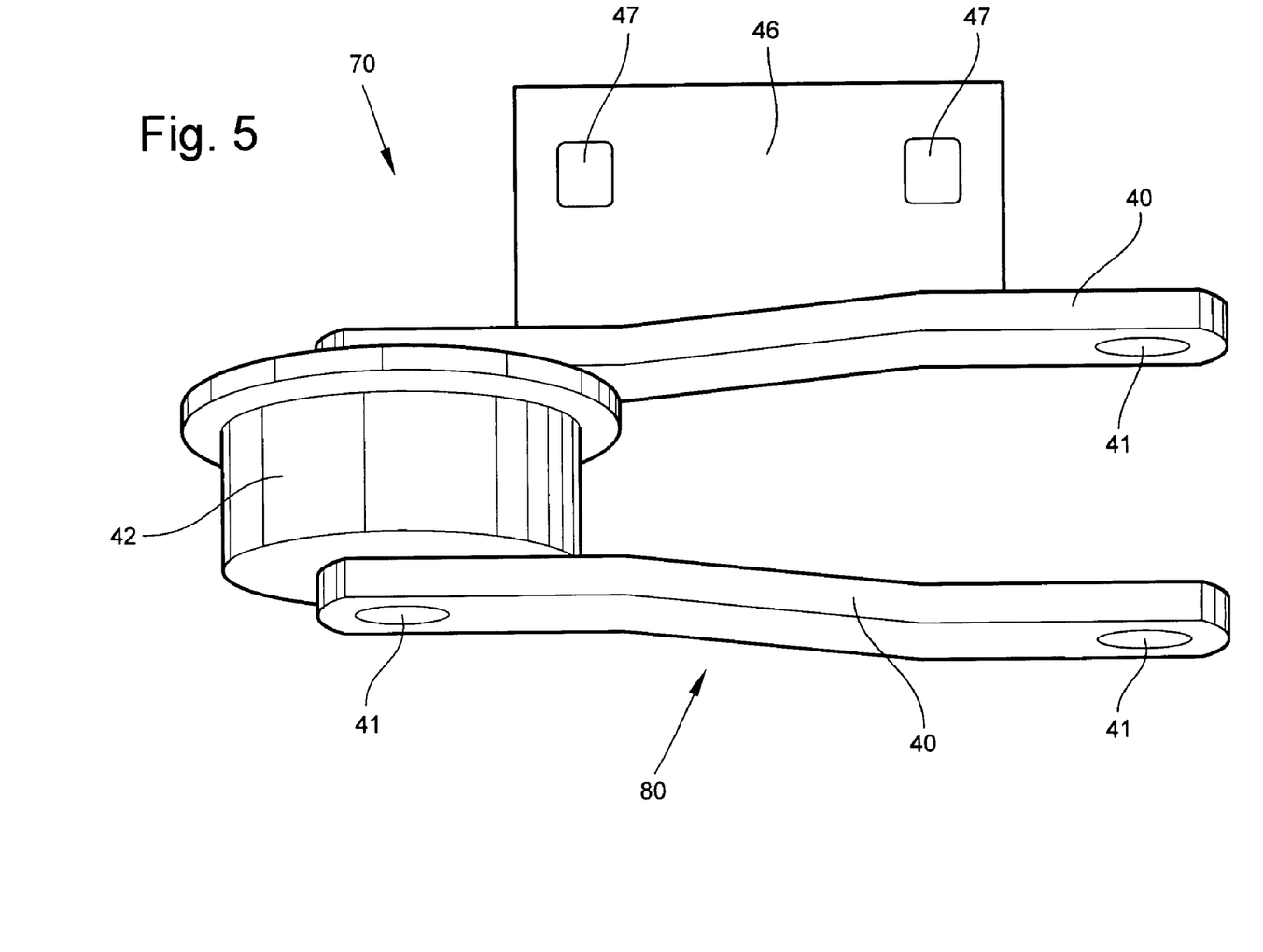
FIG. 5 is a top view of a chain link having an offset side bar in an embodiment of the present invention.

In embodiments of a chain assembly 11, a roller 42 can be rotatably mounted on the link pin 44 to provide a means of rolling support of the chain assembly 11 in contact with support members, or tracks, (not shown) in the bulk silo 10. Rollers 42 can have different sizes, depending on factors such as the load that the chain conveyor is intended to support. Rollers 42 can have flanges, as shown in FIGS. 4-6. Suitable bushings 43, for example, steel bushings, can be placed on the link pin 44 to accommodate smooth rolling of the rollers 42. Bushings 43 can be made from case-hardened steel to provide maximum wear resistance and chain life. In some embodiments, bushings 43 can have either flats or notches at the ends to prevent rotation in the side bar 40. A heavy interference fit provides positive locking for particular styles of bushings 43. Different styles of steel-bushed roller chains for conveyors are available, for example, from Webster Industries of Tiffin, Ohio.

Figure 3:
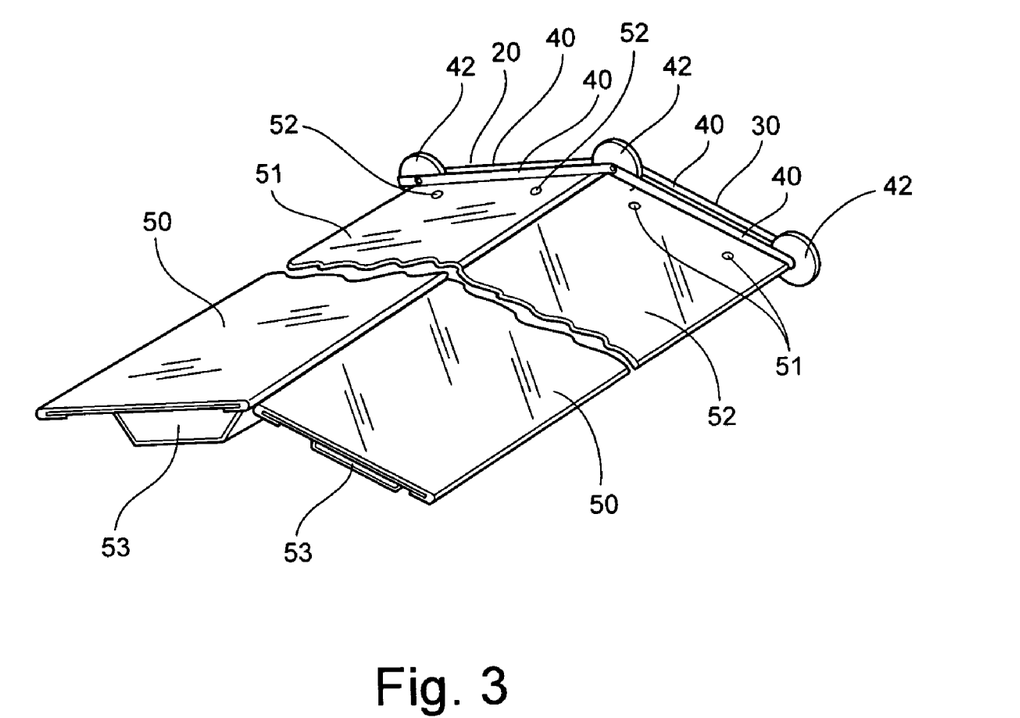
FIG. 3 is a side perspective view of a continuous chain assembly and slats for which embodiments of an apparatus and system for repairing a linked chain of the present invention are useful.

As shown in the embodiments of a continuous chain conveyor in FIGS. 2 and 3, each link 20, 30 of the chain 11 includes a side plate 46 that extends substantially perpendicularly from one side bar 40 of the link 20, 30. The side plate 46 on each link 20, 30 is adapted to attach to a slat member 50. The slat member 50 connects one link 20, 30 in one chain 11 with a corresponding link 20, 30 in the other chain 11 in a dual chain conveyor mechanism. The slat member 50 can comprise a rigid, flat piece of metal, such as stainless steel. A plurality of the slats 50 comprise a conveyor means in which adjacent slats 50 are in substantially abutting engagement in order to provide an upper surface 52 that is essentially a continuous apron which is suitable for handling tobacco in bulk. The side plates 46 and slats 50 have aligned mounting apertures 47 to receive a fastener, such as a carriage bolt, to secure the side plates 46 and slats 50 together. The slats 50 may have reinforcing members 53 integrally formed with, or attached to, the bottom surface of the slats 50. This slat construction has flexibility to bend with the chain links 20, 30 in either direction without opening the gap between the slats 50, thereby maintaining a desired fill level of tobacco along the length of the chain-slat conveyor. Such flexibility is provided by close control of the angle, or pitch, along the distance 48 between the ends of a chain link 20, 30. Such a slat construction is described in U.S. Pat. No. 3,259,228, which is incorporated herein by reference in its entirety.

In embodiments of the present invention, chain assemblies 11, including side bars 40, link pins 44, rollers 42, bushings 43, and side plates 46, can be formed of materials suitable for the strength and wear resistance desired in a chain drive mechanism in manufacturing machinery. Such materials suitable for chain drive strength and wear resistance in a tobacco bulk silo 10 include, for example, heat-treated carbon or alloy steels. The materials can also be induction-hardened or case-hardened to provide additional resistance to wear and abrasion. For example, chain assemblies 11 can be formed to have an average weight per ft.-lbs. rating in the range of 2.8-16.0. Such chain assemblies can include components having, for example, an average strength rating in the range of 14,000-77,000 lbs., and be rated for a working load in the range of 2,300-7,200 lbs.

For such tobacco bulk silo chains, half lengths of chains are manufactured only in outer link 20 widths and inner link 30 widths, each having straight side bars 60, as shown in FIG. 4. Chain half lengths are not manufactured such that one end of a half link has an outer link 20 width and the opposite end has an inner link 30 width.

With reference to FIGS. 5 and 6, in an embodiment of the present invention, a system for repair of a continuous loop chain 11 comprises a plurality of pairs of chain links. Each link includes a pair of straight, substantially parallel side bars 40. Each pair of chain links has an outer link 20 having a first width between the outer link 20 side bars 40, and an inner link 30 having a second width between the inner link 30 side bars 40. The second width is less than the first width such that the side bars 40 of the inner link 30 are adapted to fit between the side bars 40 of the outer link 20. The outer link 20 and the inner link 30 are pivotally joined to each other. In like manner, the outer link 20 of each pair of chain links is pivotally joined to the inner link 30 of the pair of chain links adjacent to the outer link 20. The inner link 30 of each pair of chain links is pivotally joined to the outer link 20 of the pair of chain links adjacent to the inner link 30. The system for repair of a continuous loop chain 11 includes a repair link 70 having a pair of offset side bars 80. The offset side bars 80 are adapted to connect on one end to the inner link 30 of one of the pairs of chain links and on the other end to the outer link 20 of another one of the pairs of chain links. In this way, a pair of chain links 20, 30 in the continuous loop chain 11 can be replaced by one or more of the repair links 70.

In one embodiment, the repair link 70 is connected to the inner link 30 of one of the pairs of chain links and to the outer link 20 of another one of the pairs of chain links that is not adjacent to the pair of chain links of which the inner link 30 forms a part. In another embodiment, the repair link 70 is connected to the inner link 30 of one of the pairs of chain links and to the outer link 20 of an adjacent other one of the pairs of chain links.

The offset side bars 80 of the repair link 70 can be gradually flared from one end to the other end, as shown in FIGS. 5 and 6. Alternatively, the offset side bars 80 of the repair link 70 can be flared by intermittent steps (not shown) from one end to the other end. For example, a custom made offset side bar 80 can have two or more different sections welded together at right angles to form an offset of one end of the repair link 70 from the other end.

In embodiments, the side bars 40 can be joined by a link pin 44, and a roller 42 can be rotatably mounted on the link pin 44 to provide for rolling support of the continuous loop chain 11. A side plate 46 can extend substantially perpendicularly from the side bar 40 of each chain link 20, 30. The side plate 46 is adapted to attach to a slat 50 that extends between two of the continuous loop chains 11. In particular embodiments, the continuous loop chain 11 to be repaired by such a system is in a tobacco bulk silo 10.

Embodiments of the present invention include an apparatus for repair of a continuous loop chain 11. The chain 11 has a plurality of pairs of chain links, each link comprising a pair of straight, substantially parallel side bars 40 and pivotally joined to an adjacent link. Each pair of chain links is pivotally joined to an adjacent pair of chain links. The apparatus includes a repair link 70 having a pair of offset side bars 80 adapted to connect on one end to an outer link 20 of one of the pairs of chain links and to connect on the other end to an inner link 30 of another one of the pairs of chain links. The outer link 20 has a first width between the outer link side bars 40, and the inner link 30 has a second width between the inner link side bars 40. The second width is less than the first width such that the side bars 40 of the inner link 30 are adapted to fit between the side bars 40 of the outer link 30.

In such an apparatus, the repair link 70 offset side bars 80 can be gradually flared from one end to the other end. Alternatively, the repair link 70 offset side bars 80 can be intermittently stepped from one end of the side bars 80 to the other end.

Embodiments of the present invention include a method for repairing a continuous loop chain 11. The chain 11 has a plurality of pairs of chain links, and each link comprises a pair of straight, substantially parallel side bars 40. Each pair of chain links comprises an outer link 20 having a first width between the outer link 20 side bars 40, and an inner link 30 having a second width between the inner link 30 side bars 40. The second width is less than the first width such that the side bars 40 of the inner link 30 are adapted to fit between the side bars 40 of the outer link 20. The method includes removing a pair of chain links 20, 30 having a defect and replacing the defective pair of chain links 20, 30 with a repair link 70 having a pair of offset side bars 80. The repair link 70 offset side bars 80 are adapted to connect on one end to an outer link 20 of one of the pairs of chain links and to connect on the other end to an inner link 30 of another one of the pairs of chain links. Due to the offset side bars 80 of the repair links 70, both links in a pair of links 20, 30 can be replaced by a single repair link 70 such that the resulting adjacent outer and inner links 20, 30, respectively, can be pivotally joined in proper operating fashion. When both links 20, 30 of a pair of links is replaced by one repair link 70, the tension on the continuous loop chain 11 may need to be tightened to accommodate for the loss of the length of a half link removed in the pair. In addition, such a method can include adding a second repair link 70 to the continuous loop chain 11 so as to provide additional chain length to compensate for the removal of both links 20, 30 in a pair of chain links.

A method for repairing a continuous loop chain 11 can include replacing a defective pair of chain links 20, 30 with a repair link 70 by connecting the inner link 30 of one of the pairs of chain links and the outer link 20 of a non-adjacent pair of chain links. In other embodiments of a method, replacing the defective pair of chain links 20, 30 with a repair link 70 can comprise connecting the inner link 30 of one of the pairs of chain links and the outer link 20 of an adjacent pair of chain links. Such methods of replacing the defective pair of chain links 20, 30 with a repair link 70 are useful for repairing a tobacco bulk silo 10 continuous loop chain 11 conveyor means.

Although the present invention has been described with reference to particular embodiments, it should be recognized that these embodiments are merely illustrative of the principles of the present invention. Those of ordinary skill in the art will appreciate that an apparatus and system for repairing a linked chain of the present invention may be constructed and implemented in other ways and embodiments. Accordingly, the description herein should not be read as limiting the present invention, as other embodiments also fall within the scope of the present invention.

What is claimed is:

1. A system for repair of a continuous loop chain, comprising:
    a plurality of pairs of chain links;
    each link comprising a pair of straight, substantially parallel side bars;
    each pair of chain links having:
        (a) an outer link having a first width between the outer link side bars; and
        (b) an inner link having a second width between the inner link side bars, the second width being less than the first width such that the side bars of the inner link are adapted to fit between the side bars of the outer link;
        (c) the outer link and the inner link being pivotally joined;
    the outer link of each pair of chain links being pivotally joined to the inner link of the pair of chain links adjacent to the outer link and the inner link of each pair of chain links being pivotally joined to the outer link of the pair of chain links adjacent to the inner link; and
    a repair link having a pair of offset side bars adapted to connect on one end to the inner link of one of the pairs of chain links and on the other end to the outer link of another one of the pairs of chain links.

2. The system of claim 1, wherein the inner link of one of the pairs of chain links and the outer link of another one of the pairs of chain links to which the repair link connects are non-adjacent.

3. The system of claim 1, wherein the inner link of one of the pairs of chain links and the outer link of another one of the pairs of chain links to which the repair link connects are adjacent.

4. The system of claim 1, wherein the repair link offset side bars are flared from the one end to the other end.

5. The system of claim 1, wherein the repair link offset side bars are intermittently stepped from the one end to the other end.

6. The system of claim 1, the side bars being joined by a link pin, further comprising a roller rotatably mounted on the link pin to provide for rolling support of the continuous loop chain.

7. The system of claim 1, further comprising a side plate extending substantially perpendicularly from the side bar of each chain link and adapted to attach to a slat that extends between two of the continuous loop chains.

8. The system of claim 1, wherein the continuous loop chain is in a tobacco bulk silo.

9. An apparatus for repair of a continuous loop chain, the chain having a plurality of pairs of chain links, each link comprising a pair of straight, substantially parallel side bars and pivotally joined to an adjacent link, each pair of chain links pivotally joined to an adjacent pair of chain links, the apparatus comprising:
    a repair link having a pair of offset side bars adapted to connect on one end to an outer link of one of the pairs of chain links, the outer link having a first width between the outer link side bars, and adapted to connect on the other end to an inner link of another one of the pairs of chain links, the inner link having a second width between the inner link side bars, the second width being less than the first width such that the side bars of the inner link are adapted to fit between the side bars of the outer link.

10. The apparatus of claim 9, wherein the repair link offset side bars are flared from the one end to the other end.

11. The apparatus of claim 9, wherein the repair link offset side bars are intermittently stepped from the one end to the other end.

12. The apparatus of claim 9, the side bars being joined by a link pin, further comprising a roller rotatably mounted on the link pin to provide for rolling support of the continuous loop chain.

13. The apparatus of claim 9, further comprising a side plate extending substantially perpendicularly from the side bar of each chain link and adapted to attach to a slat that extends between two of the continuous loop chains.

14. A method for repairing a continuous loop chain, the chain having a plurality of pairs of chain links, each link comprising a pair of straight, substantially parallel side bars, each pair of chain links comprising an outer link having a first width between the outer link side bars, and an inner link having a second width between the inner link side bars, the second width being less than the first width such that the side bars of the inner link are adapted to fit between the side bars of the outer link, the method comprising:
    removing a pair of chain links having a defect;
    replacing the defective pair of chain links with a repair link having a pair of offset side bars adapted to connect on one end to an outer link of one of the pairs of chain links and adapted to connect on the other end to an inner link of another one of the pairs of chain links.

15. The method of claim 14, further comprising adding a second repair link to the continuous loop chain.

16. The method of claim 14, wherein replacing the defective pair of chain links with a repair link comprises connecting the inner link of one of the pairs of chain links and the outer link of a non-adjacent pair of chain links.

17. The method of claim 14, wherein replacing the defective pair of chain links with a repair link comprises connecting the inner link of one of the pairs of chain links and the outer link of an adjacent pair of chain links.

18. The method of claim 14, comprising replacing the defective pair of chain links with a repair link in a tobacco bulk silo continuous loop chain conveyor means.

\* \* \* \* \*